Figure 1:
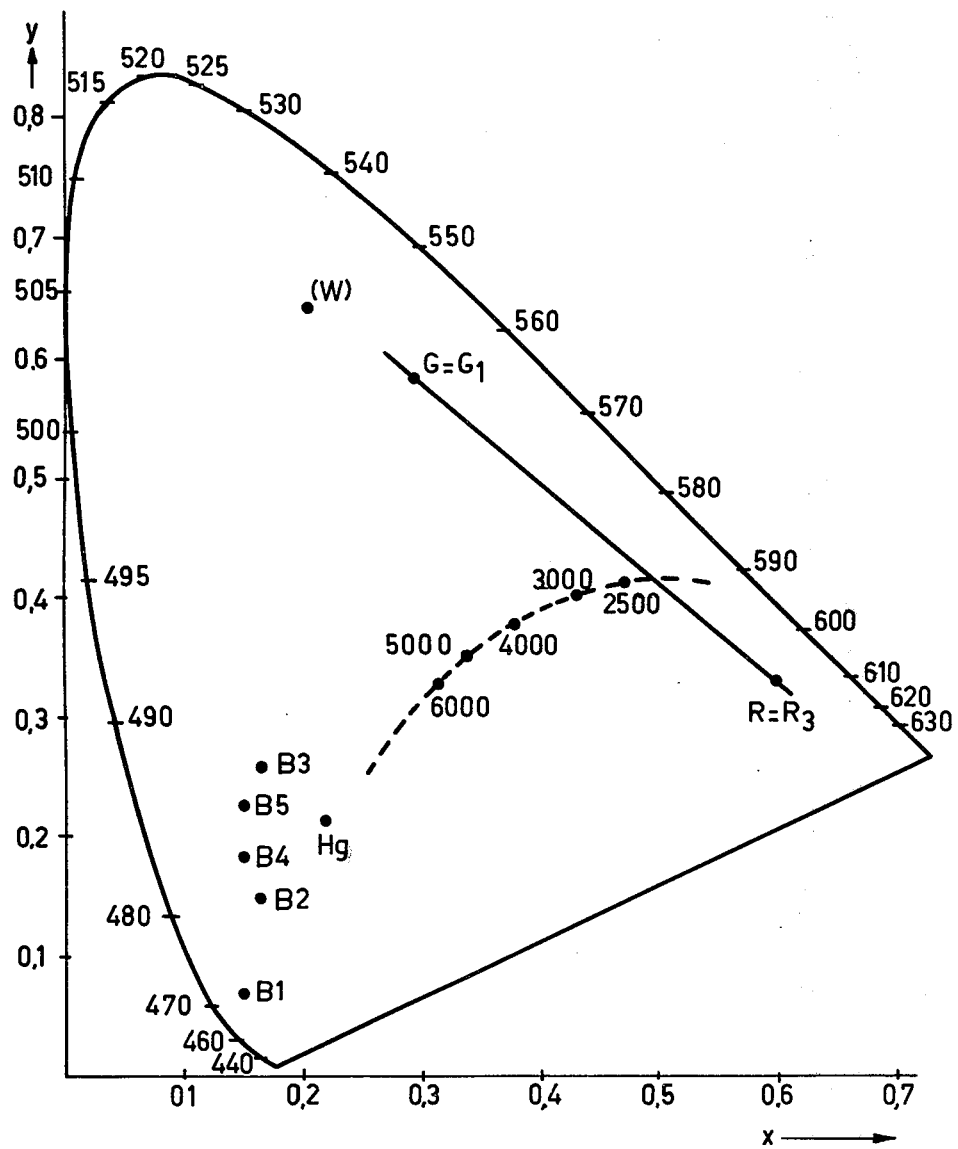

United States Patent [19]
Verstegen et al.

[11] 3,937,998
[45] Feb. 10, 1976

[54] LUMINESCENT COATING FOR LOW-PRESSURE MERCURY VAPOUR DISCHARGE LAMP

[75] Inventors: Judicus Marinus Pieter Jan Verstegen; Dragutin Radielovic; Lambertus Wilhelmus Johannes Manders, all of Eindhoven, Netherlands

[73] Assignee: U.S. Philips Corporation, New York, N.Y.

[22] Filed: Sept. 25, 1974

[21] Appl. No.: 509,142

[30] Foreign Application Priority Data
Oct. 5, 1973 Netherlands.................... 7313694

[52] U.S. Cl. ............................................. 313/487
[51] Int. Cl.² ........................................ H01J 61/44
[58] Field of Search ................................ 313/487

[56] References Cited
UNITED STATES PATENTS
3,114,067 12/1963 Henderson.................... 313/487
3,748,517 7/1973 Haft............................... 313/487
3,858,082 12/1974 Thornton, Jr..................... 313/487

*Primary Examiner*—Palmer C. Demeo
*Attorney, Agent, or Firm*—Frank R. Trifari

[57] ABSTRACT

A low-pressure mercury vapour discharge lamp provided with a luminescent coating comprising three luminescent materials each emitting in a narrow spectral range. The first material has an emission band with a maximum between 430 and 490 nm; the second material has its emission in the range 520–565 nm; the third material emits in the range 590–630 nm. The second material is defined by one of the formulas:

a. $Ce_{1-x-y}La_xTb_yMgAl_{11}O_{19}$
b. $(Ce_{1-x-y}La_xTb_y)_2O_3 \cdot nAl_2O_3$ The first material is preferably chosen from c. $A_{1-p}Eu_pMg_{2-q}Mn_qAl_{16}O_{27}$
d. $B_{5.5-x}Eu_xMg_{6-y}Mn_yAl_{55}O_{94}$ (A and B are barium and/or strontium).

9 Claims, 3 Drawing Figures

LUMINESCENT COATING FOR LOW-PRESSURE MERCURY VAPOUR DISCHARGE LAMP

The invention relates to a low-pressure mercury vapour discharge lamp having an envelope containing a quantity of mercury and a quantity of rare gas and provided with electrodes, between, which the discharge takes place during operation, and with a luminescent coating which upon excitation by ultraviolet radiation generated in the mercury vapour discharge emits visible light. More particularly the invention relates to such a lamp intended for general illumination purposes whose colour temperature of the emitted radiation has a value of between 2300 and 8000 K and with which both a high luminous flux and a satisfactory colour rendition is obtained.

In a recent Article by M. Koedam and J. J. Opstelten in "Lighting Research and Technology", Vol. 3 No. 3 (1971) page 205 it is shown that a satisfactory rendition of the colours of an object can be obtained by illuminating the object with radiation whose spectral distribution consists of three spectral lines. In this connection a satisfactory colour rendition is understood to mean that the general colour rendering index Ra (see the publication C.I.E. No. 13, 1965 of the Commission Internationale de l'Eclairage) has a high value of for example 80 or more. To achieve this satisfactory colour rendition the spectral lines must be located within three specific spectral ranges, namely one line in the blue part of the spectrum between 455 and 485 nm, one line in the green part of the centrum between 525 and 560 nm and one line in the red part of the spectrum between 595 and 620 nm. The optimum location of each line in the spectral ranges is determined by the desired colour temperature of the radiation, on the understanding that with decreasing values of the colour temperature the optimum location of the three spectral lines is found at longer wavelengths in the three ranges. By suitable choice of the location of the three spectral lines values of the colour temperature of approximately 6800 and 2300 K can be achieved as is apparent from the Article by Koedam and Opstelten, where in all cases the colour rendering index has a value of 79 or more.

It is quite desirable to use the above-mentioned principle of a radiation source emitting in three spectral lines in practical lamps because then a satisfactory colour rendition in combination with a high luminous flux can be realized. A luminous flux is obtained which is larger than that of known lamps having a satisfactory colour rendition and a continuous spectral distribution of the emitted radiation. The practical use is, for example, possible in low-pressure mercury vapour discharge lamps provided with luminescent materials exhibiting the desired emissions.

When using luminescent materials in a low-pressure mercury vapour discharge lamp for the envisaged object the fact is to be taken into account that most luminescent materials do not exhibit line emission. Many of such materials emit in a broadened line or in a band. It is alternatively possible for a luminescent material to emit in a group of lines which together can form an emission band, in a plurality of line groups or in a plurality of emission bands. It has been found that also with such spectral distributions deviating from the line shape a satisfactory colour rendition is possible. A condition is then, however, that there is no or only little overlap between the emissions in the three above-mentioned spectral ranges. One requirement is that the materials luminescing in the green and red ranges have their emission mainly in the wavelength range between 520 and 565 nm and between 590 and 630 nm, respectively, i.e. at least 50% of the radiation energy emitted by these materials is found in the said ranges. For the material emitting in the blue range materials having a band emission are mainly available in practice; for these materials the requirement holds that the half value width of the emission band (that is to say, the width of the band measured at a radiation intensity which is 50% of the maximum intensity) is less than 100 nm.

In the choice of the luminescent materials to be used the following factors play a role: spectral distribution and colour point of the emitted radiation, the conversion efficiency of the exciting ultraviolet radiation into visible radiation, the application resistance and the decline in the lamp. Application resistance is understood to mean the ability of the luminescent material to maintain the luminescent properties, particularly the efficiency when it is provided and processed in a lamp. Decline in the lamp is understood to mean the decrease in the luminous flux of the luminescent material during the life-time of the lamp.

For the material luminescing in the green range a choice may be principally be made from a number of known luminescent materials. Notably the materials activated by bivalent manganese or by terbium are suitable. Netherlands Patent application No. 7109983 describes as the most important green luminescing material for the envisaged object willemite (zinc silicate activated by bivalent manganese: $Zn_2SiO_4$:Mn) which material has a high efficiency. The use of manganese-activated magnesium gallate ($MgGa_2O_4$:Mn) or manganese-activated magnesium gallate aluminate ($Mg(Ga,Al)_2O_4$:Mn) is alternatively feasible which materials have comparable properties, but are relatively expensive.

The use of willemite has a number of disturbing drawbacks. This material gives rise to an unstable lamp behaviour as a result of the frequently very high decline in the luminous flux during the lifetime of the lamp and also as a result of a non-optimum and a poorly reproducible application resistance. Lamps comprising willemite may therefore exhibit a very troublesome colour variation of the emitted radiation during the lifetime. Furthermore it is found that the emission of willemite is too shortwaved so that a satisfactory colour rendering index particularly at low colour temperatures is not verywell possible.

An object of the invention is to provide a lamp acoording to the above-mentioned principle which comprises a material luminescing in the green spectral range with a high efficiency and with which the drawbacks of the use of the known willemite can be obviated. Furthermore it is an object of the invention to provide such combinations of luminescent materials for these lamps that colour temperatures of the emitted radiation in the entire range from 2,300 to 8,000 K can be achieved.

A low-pressure mercury vapour dischargelamp accoording to the invention has a vacuum tight sealed radiation transmitting envelope comprising a quantity of mercury and a quantity of rare gas and provided with electrodes between which the discharge takes place during operation, and a luminescent coating comprising three luminescent material, the first material having an emission band with a maximum in the wavelength range between 430 and 490 nm and a half value width of less than 100 nm, the second material having its emission mainly in the wavelength range between 520 and 565 nm and the third material having its emission mainly in the wavelength range between 590 and 630 nm and is characterized in that the second luminescent material is activated by terbium and is defined by one of the formulas:

a. $Ce_{1-x-y}La_xTb_yMgAl_{11}O_{19}$   A.
b. $(Ce_{1-x-y}La_xTb_y)_2O_3 \cdot nAl_2O_3$   B.

in which $0 \leq x \leq 0.50$
$0.20 \leq y \leq 0.50$
$x+y \leq 0.90$
$10 \leq n \leq 12$ and in which up to a maximum of 25 at% of aluminium may be replaced by gallium and/or scandium and magnesium may be entirely or partly replaced by zinc and/or beryllium.

The materials to be used according to the invention for the green emission have a very high efficiency which is comparable with or is even higher than that of willemite. These materials have an aluminate fundamental lattice with a crystal structure which is analogous to that of hexagonal magnetoplumbite and are further described in the Netherlands Patent applications 7214862 (formula (a)) and 7216765 (formula (b)) not published yet. The said green luminescing aluminates have not only a high efficiency but also a very satisfactory application resistance and a very low decline of the luminous flux in the lamp.

A great advantage of the use of the green luminescing aluminates proposed for lamps which emit in the three said spectral ranges is that very low colour temperatures (as from approximately 2300 K) of the radiation emitted by the lamp can be achieved while maintaining high values of the colour rendering index. The use of willemite in such lamps yields an unsatisfactory colour rendition at low colour temperatures because the emission of willemite as already stated hereinbefore, is too shortwaved. Experiments have also shown that although the emission of the trivalent terbium ion is in principle usable as a green component, not all terbium-activated luminescent materials are suitable if low colour temperatures are to be achieved. This may be clarified with reference to FIG. 1 in which the colour gamut in the x, y-C.I.E. coordinate plane is shown. In the colour gamut the line of the black bodies is shown with the colour temperatures 2500, 3000, 4000, 5000 and 6000 K. The reference Hg denotes the colour point of the visible spectrum of the low-pressure mercury vapour discharge. This mercury spectrum must always be considered when composing a mixture of luminescent materials for a low-pressure mercury vapour discharge lamp because a portion, though small, (for example 7% when using luminescent materials having a high efficiency) of the radiation emitted by such a lamp consists of visible mercury radiation. The influence of the mercury spectrum on the colour point of a luminescent material becomes manifest in a shift of this colour point into the direction of the point Hg. This influence is greater as the efficiency of the luminescent material is lower. Furthermore the shift of the original colour point of the luminescent material in the x, y plane is larger as this original point is farther away from the point Hg. The colour points R and G of two luminescent materials suitable as red and green components, respectively, in a lamp according to the invention are shown in FIG. 1 while the visible mercury spectrum present has been taken into account. A lamp having a colour temperature of less than 2500 K can be manufactured by means of the luminescent materials of the colour points R and G because the connection line RG in the colour gamut intersetcts the line of the black bodies to the right of the point 2500 K. This consideration leads to a number of requirements to be satisfied by a terbium-activated luminescent material. Firstly the material must have a very dominant green emission. The emission of the terbium ion consists of at least 4 lines namely at approximately 543, 490, 570 and 610 nm. The two first lines are generally the strongest and of these two the 543 nm line is generally the strongest. The ratio between the green (543 nm) and blue (490 nm) emission of a terbium-activated material also determines the usability of the material, If the green/blue ratio is too low, the situation may arise where the connection line RG no longer intersetcts the line of the black bodies to the right of the 2500 K point. Secondly the material must have a high efficiency because the influence of the mercury spectrum on the colour point of the material is relatively great (point G is far away from point Hg). If the efficiency is too low, the line RG may be displaced again in such a manner that a colour temperature of less than 2500 K is no longer achieved. Finally the material must have a satisfactory application resistance and a low decline in the lamp. If this requirement is not satisfied the lamp will change its colour during its lifetime.

It has been found that the proposed terbium-activated aluminates for the lamps according to the invention eminently satisfy the above-mentioned requirements. When using a suitable blue luminescing material it is furthermore possible to manufacture lamps according to the invention with a colour temperature of the emitted radiation in the entire range of from 2,300 to 8,000 K.

A further advantage of the use of terbium-activated aluminates as compared with the use of the known willemite is that the lumen equivalent of the radiation emitted by the aluminates is larger than that of willemite so that higher luminous fluxes are obtained. furthermore the distance between the colour point of the aluminates and the line of the black bodies is shorter than the distance between the colour point of willemite (see point (W) in FIG. 1) and this line. Consequently when using the aluminates in a mixture of red and green luminescing materials relatively more of this green luminescing material must be used to reach the line of the black bodies than in the case of using willemite. This is very advantageous because the green luminescing material contributes to a considerable extent to the luminous flux so that when using the aluminates luminous fluxes are obtained which are larger than when using willemite.

It is to be noted that in known lamps having a satisfactory colour rendition and a continuous spectral distribution of the emitted radiation a low colour temperature (for example 2500 K) is only possible if separate absorption layers are used which of course has a very detrimental influence on the luminous flux of the lamp.

In the green luminescing aluminates used in the lamps according to the invention the exciting energy is transferred from the cerium to the terbium activator. It has been found that ceriumcan be partly replaced by lanthanum. Generally, however, such a replacement does not yield advantages. A replacement of more than 50% of cerium by lanthanum is not used because then a too low absorption of the exciting radiation would be obtained. For this reason the replacement of cerium by lanthanum combined with a terbium activator is chosen to be not more than 90% ($x+y \leq 0.90$). The terbium content $y$ is chosen to be between the limits 0.20 and 0.50 because then high quantum efficiencies are obtained.

In a lamp according to the invention an aluminate defined by the formula $Ce_{1-x-y}La_xTb_yMgAl_{11}O_{19}$ is preferably used as a second green luminescing material in which $0 \leq x \leq 0.20$ and $0.20 \leq y \leq 0.40$. In fact, the highest luminous fluxes are achieved with these materials.

Low-pressure mercurcy vapour discharge lamps according to the invention in which a material activated by bivalent europium is used as a first blue luminescing material are preferred because these materials have a very suitable emission spectrum. A material known for this purpose is strontiumchloroapatite activated by bivalent europium (see the said Netherlands Patent application No. 7109983) whose emission spectrum satisfactorily meet the requirements imposed. A drawback of this material is the relatively low efficiency and furthermore the dissatisfying application resistance and decline in the lamp. These drawbacks are particularly noticeable if the material is used in lamps having comparatively high colour temperatures ($\geq 4000$ K).

The drawbacks of the use of the known strontium-chloroapatite are obviated in a preferred embodiment of a lamp according to the invention in which an aluminate of barium and/or strontium activated by bivalent europium or by bivalent europium and by bivalent manganese is used as a first luminescent material, which aluminate has a hexagonal crystal structure akin to the structure of the hexagonal ferrites. Such materials are, for example, the materials defined by the formula $Ba_xSr_yEu_pAl_{12}O_{19}$ in which $x+y+p = 1$ and $0.001 \leq p \leq 0.1$ (see Netherlands Patent application N. 6715823) and defined by the formula $Ba_xSr_yEu_pMn_qAl_{12}O_{19}$ in which $x+y+p+q = 1$, $0.001 \leq p \leq 0.1$ and $0.001 \leq l \leq 0.15$ (see Netherlands Patent application No. 7214860). These aluminates have the crystal structure of magnetoplumbite (one of the hexagonal ferrites) and have a satisfactory application resistance and low decline in the lamp.

Aluminates activated by europium and optionally also by manganese with a very high efficiency are the ternary aluminates of barium and/or strontium and of magnesium which have a hexagonal ferrite structure and in which the atomic fraction of aluminium is larger than 1.8 times the atomic fraction of magnesium and is also larger than 3.7 times the atomic fraction of barium and/or strontium and in which up to a maximum of 25 at% of aluminium may be replaced by gallium and/or scandium, and magnesium may be entirely or partly replaced by zinc and/or beryllium. These ternary aluminates (described in Netherlands Patent application No. 7214862 not published yet) are therefore preferably used as a first luminescent material in a lamp according to the invention.

In one preferred embodiment of a lamp according to the invention the first luminescent material is such a ternary aluminate which is defined by one of the formulas:

$A_{1-p}Eu_pMg_{2-q}Mn_qAl_{16}O_{27}$ ,C
$B_{5.5-x}Eu_xMg_{6-y}Mn_yAl_{55}O_{94}$ ,D in which A and B represent at least one of the elements barium and strontium and in which $0.05 \leq p \leq 0.20$
$0.25 \leq x \leq 1.50$
$0 \leq q/p \leq 1.5$
$0 \leq y/x \leq 1.5$ It has been found that of the large group of luminescent ternary aluminates having a hexagonal ferrite structure the materials defined by the formulas (c) and (d) have the best properties for use in the relevant lamp type. This is particularly the case if at least 50 at% of the element A is barium and at least 50 at% of the element B is strontium.

The above shows that the luminescent aluminates having a hexagonal crystal structure (akin to the structure of hexagonal ferrite) in a lamp according to the invention may not only comprise europium but also manganese as an activator. If these aluminates comprise manganese a transfer of part of the exciting energy from europium to manganese takes place. In that case the aluminate emits not only in the europium band but also in the band of bivalent manganese (maximum at approximately 515 nm). Coactivation of the luminescent aluminate with manganese has the advantage that the colour rendering index of the lamp increases. In that case a slightly lower luminous flux is obtained. A lamp according to the invention provides the possibility of choosing an optimum luminous flux (activation of the aluminate by europium only) or an optimum colour rendition (activation by europium and manganese). The ratio between the manganese and europium contents is preferably chosen to be not more than 1.5 (see the upper limit for $q/p$ in formula (c) and for $y/x$ in formula (d)). At larger values of the said ratio the manganese band dominates and not only a further decrease in the luminous flux is obtained but also a decrease in the colour rendering index.

Materials activated by trivalent europium are mainly suitable as a third luminescent material in a lamp according to the invention, such as the vanadates or fosfate vanadates of yttrium and/or of gadolinium activated by trivalent europium or the oxysulfides of yttrium and/or of lanthanum. In a lamp according to the invention a rare earth oxide activated by trivalent europium defined by the formula $Ln_2O_3:Eu^{3+}$ is preferably used as a third luminescent material, where Ln represents at least one of the elements yttrium, gadolinium and lutetium. These rare earth oxides are very efficient red luminescing materials having a very suitable emission for the envisaged object.

In a special preferred embodiment of a lamp according to the invention the luminescent coating not only comprises the three luminescent materials but also one or more of the following luminescent materials in a quantity of not more than 50% by weight: antimony-activated alkaline earth halofosfate, antimony and manganese-activated alkaline earth halofosfate, tin-activated alkaline earth magnesium orthofosfate, manganese-activated magnesium arsenate and manganese-activated magnesium germanate. Replacement of part of the three luminescent materials emitting in the above-mentioned spectral ranges by the conventional luminescent materials referred to is surprisingly found to have relatively little influence on the luminous flux and the colour rendition of the lamp. Such a partial replacement is advantageous because this makes the lamp cheaper. If the luminescent coating of the lamp comprises more than 50% by weight of the said conventional luminescent materials, an unwanted decrease in the luminous flux and/or the colour rendering index is obtained.

The invention will not be further described with reference to a drawing and a number of examples.

Figure 2:
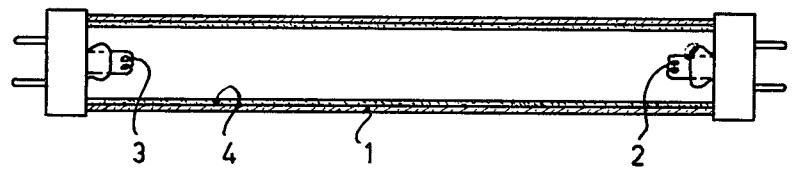
Figure 3:
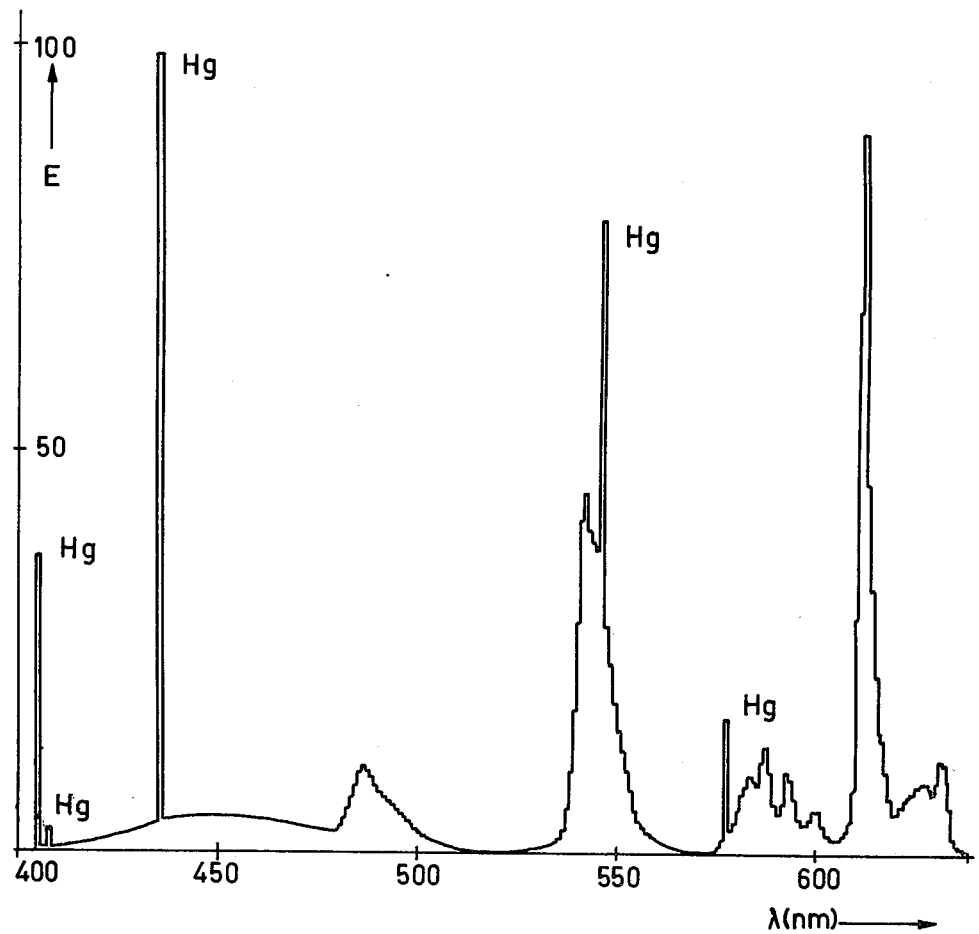

FIG. 1 shows the colour gamut in the $x$, $y$ coordinate plane referred to hereinbefore;

FIG. 2 diagrammatically shows a low-pressure mercury vapour discharge lamp according to the invention and FIG. 3 shows the spectral energy distribution of the radiation emitted by a lamp according to the invention.

In FIG. 2 the reference numeral 1 denotes the glass envelope of a low-pressure mercury vapour discharge lamp according to the invention. Electrodes 2 and 3 between which the discharge takes place during operation of the lamp are provided on both ends of the lamp. The lamp is provided with a rare gas mixture which serves as an ignition gas and furthermore with a small quantity of mercury. The inner side of the envelope 1 is coated with a luminescent coating 4 comprising a mixture of three luminescent materials according to the invention. This mixture may be provided in a conventional manner on the envelope 1, for example, by means of a suspension comprising the three luminescent materials. A reflector coating for visible radiation may be provided in known manner in a lamp according to the invention between the glass envelope 1 and the luminescent coating 4, which reflector coating extends over a part of the envelope 1. Furthermore it is possible to deviate from the straight tubular shape shown in FIG. 2 and to form the lamp as a curved tube, for example, as a torus. The invention has the advantage that such a reflector coating or a curved shape of the tube is also possible for lamps having a very satisfactory colour rendition at a low colour temperature of the emitted radiation. Hitherto such a combination of a low colour temperature and a satisfactory colour rendition had only been possible for lamps which had not only the luminescent coating but also an extra absorption coating. In practice it is very difficult to provide such two-coating lamps with a reflector coating. Furthermore it has been found in practice that it is not very well possible to form these lamps in a curved shape.

The following table I comprises the formulas of a number of luminescent materials which may be used in a lamp according to the invention. The first column states the luminescent material with a character and a figure. This indication will hereinafter be used for the relevant luminescent material. In addition to the formula (in column 2) table I furthermore states the results of measurements on lamps coated with these materials. In the first place the $x$ and $y$ co-ordinates of the colour point of the lamp provided with the luminescent material are mentioned. In the second place the luminous flux (LO) in lm/W after 100 operating hours is mentioned. The reference QR denotes the absolute quantum efficiency (in %) upon excitation of the material by short-wave ultraviolet radiation (predominantly 254 nm). The columns $\lambda_{max}$ and hwb finally indicate the location of the maximum of the emitted radiation in the spectrum and the half value width of the strongest emission band. The colour point of a number of the luminescent materials stated in table I are shown in FIG. 1.

TABLE I

| material | formula | colour point x | colour point y | LO (lm/W) | QR (%) | $\lambda_{max}$ (nm) | hwb (nm) |
|---|---|---|---|---|---|---|---|
| G1 | $Ce_{0.67}Tb_{0.33}MgAl_{11}O_{19}$ | 0.295 | 0.579 | 106 | 78 | 543 | 8 |
| R1 | $Y_{1.95}Eu_{0.05}O_3$ | — | — | 66 | 99 | 611 | 2 |
| R2 | $Y_{1.92}Eu_{0.08}O_3$ | — | — | 65 | 99 | 611 | 2 |
| R3 | $Y_{1.9}Eu_{0.1}O_3$ | 0.597 | 0.331 | 66 | 99 | 611 | 2 |
| B1 | $Ba_{0.9}Eu_{0.1}Mg_2Al_{16}O_{27}$ | 0.151 | 0.066 | 21 | 95 | 450 | 50 |
| B2 | $Ba_{1-x}Eu_xAl_2Si_2O_8$  1) | 0.161 | 0.147 | 29 | 73 | 445 | 85 |
| B3 | $Ba_{2-x}Eu_xBeP_2O_8$  2) | 0.164 | 0.257 | 48 | 80 | 480 | 80 |
| B4 | $Sr_5Eu_{0.5}Mg_6Al_{55}O_{94}$ | 0.149 | 0.181 | 48 | 99 | 465 | 65 |
| B5 | $Ba_{0.9}Mg_{1.9}Eu_{0.1}Mn_{0.1}Al_{16}O_{27}$ | 0.149 | 0.225 | 60 | 90 | 450,512 | 50,27 |
| B6 | $Ba_{0.86}Eu_{0.14}Mg_2Al_{16}O_{27}$ | — | — | 26 | 95 | 450 | 50 |
| B7 | $Sr_{4.93}Eu_{0.07}(PO_4)_3Cl$ | — | — | 12 | 55 | 450 | 35 |

1) see German Patent Specification 2.028.376
2) see Netherlands Patent Application 7307627

To check the behaviour in lamps, notably the decline in the luminous flux during the lifetime of some pf the luminescent materials to be used a number of test lamps (of the 40 W-type) was made all of which only comprised one luminescent material. Table II states for each test lamp the measured value of the luminous flux (in lm/W) after 0, 100, 1000 and in some cases 2500 hours of operation. A clear picture of the extent of decline is obtained from the value of the luminous flux expressed as a percentage of the luminous flux at 100 hours. The first column of table II states the spectral range in which the material emits. The used luminescent material is denoted in column 2 by the above-mentioned characters and figures.

TABLE II

| colour | lum.mat. | | 0u | % | 100u | % | 1000u | % | 2500u | % |
|---|---|---|---|---|---|---|---|---|---|---|
| green | G1 | | 108.9 | 102.3 | 106.4 | 100 | 104.4 | 98.1 | — | — |
| | G2 | 1) | 104.5 | 102.0 | 102.5 | 100 | 99.7 | 97.3 | 96.7 | 94. |
| | (W) | 2) | 105.0 | 111.0 | 94.0 | 100 | 83.7 | 89.0 | 69.0 | 73. |
| blue | B1 | | 21.5 | 101.9 | 21.1 | 100 | 19.9 | 94.3 | 19.5 | 92. |
| | B6 | | 26.0 | 101.6 | 25.6 | 100 | 24.4 | 95.3 | — | — |
| | B7 | | 12.5 | 105.1 | 11.9 | 100 | — | — | — | — |
| red | R1 | | 69.2 | 104.5 | 66.2 | 100 | 61.9 | 93.5 | — | — |
| | R2 | | 66.6 | 102.9 | 64.7 | 100 | 62.2 | 96.1 | — | — |
| | R3 | | 68.1 | 103.7 | 65.7 | 100 | 63.0 | 95.9 | — | — |

1) the luminescent material G2 is defined by the same formula as the material G1, but belongs to a different production batch.
2) the lamp denoted by (W) is only included for the purpose of comparison. This lamp contains the known willemite ($Zn_2SiO_4$—$Mn^{2+}$) as a luminescent material which is used in lamps not according to the invention.

Table II clearly shows that the green luminescinG materials to be used according to the invention have a very high luminous flux and a very low decline of the luminous flux. Particularly the decline is found to be considerably better than that of willemite hitherto used for the envisaged object. The table furthermore shows the favourable lamp behaviour of several blue luminescing materials for use in a lamp according to the invention. It is also evident that the europium-activated aluminates having a hexagonal ferrite structure (B1, B6) are preferred to the known europium-activated strontium chloroapatite (B7) because these aluminates yield a much larger luminous flux and also exhibit a decline which is less unfavourable. The measurements on the lamps comprising the red luminescing materials shown that these materials have high luminous fluxes and exhibit an eminent lamp behaviour.

It has been checked by means of calculations which values of the luminous flux (1m/W) and colour rendering index (Ra) are achieved with a given combination of luminescent materials according to the invention at different values of the colour temperature of the emitted radiation. The calculation was performed for four different blue luminescing materials, namely the materials B1, B2, B3 and B4. The combination comprises the materials G1 and R3 in all cases as green and red luminescing materials, respectively. The result of these calculations are shown in table III.

TABLE III

| blue lum. mat. | colour temperature of the emitted radiation | | | | | | | |
|---|---|---|---|---|---|---|---|---|
| | 2500 K | | 3000 K | | 4000 K | | 6500 K | |
| | lm/W | Ra | lm/W | Ra | lm/W | Ra | lm/W | Ra |
| B1 | 80 | 83 | 79 | ·82 | 77 | 80 | 70 | 76 |
| B4 | 80 | 83 | 79 | 86 | 77 | 90 | 71 | 90 |
| B2 | 79 | 83 | 77 | 83 | 72 | 83 | — | — |
| B3 | 79 | 84 | 77 | 87 | 71 | 91 | — | — |

Table III shows that luminous flux values from approximately 80 (at a low colour temperature) to 70 lm"W (at a high colour temperature) can be achieved. A colour rendering index of 80 or more is possible in almost all cases. A given value of the colour temperature is achieved with a given combination of luminescent materials by correctly choosing the percentage by weight of the three materials in the combination and therefore their relative contribution to the luminous flux. The table shows that with a given combination of luminescent materials lamps can be manufactured with which the entire range of the desired colour temperatures (from approximately 2500 K to 6500 K and over) can be covered. This is of course very advantageous because only three luminescent materials (chosen in an optimum manner) are sufficient for the manufacture of low-pressure mercury vapour discharge lamps and with which all lamp types can be obtained.

Examples A to D.

A. A lamp as shown in FIG. 2 having a power of 40 W during operation was provided with a luminescent coating comprising 3% by weight of the material B1, 30% by weight of the material G1 and 67% by weight of the material R3. Measurement of the colour temperature (Tk), colour rendering index (Ra), luminous flux at 0 hour ($LO_0$ in 1m/W) and luminous flux at 100 hours ($LO_{100}$ in 1m/W) yielded the following results:

| Tk | Ra | $LO_0$ | $LO_{100}$ |
|---|---|---|---|
| 2600 | 85 | 80.8 | 79.2 |

B. A lamp provided with the same luminescent material as the lamp described under A, but in the quantities 7% by weight of B1, 29% by weight of G1 and 64% by weight of R3 was measured as follows:

| Tk | Ra | $L_0$ | $LO_{100}$ |
|---|---|---|---|
| 3000 | 85 | 82.8 | 80.0 |

C. A lamp comprising the same luminescent materials as the lamps described hereinbefore under A and B in the quantities 18% by weight of B1, 34% by weight of G1 and 48% by weight of R3 yielded the following measuring results:

| Tk | Ra | $LO_0$ | $LO_{100}$ |
|---|---|---|---|
| 4000 | 85 | 83.5 | 80.5 |

The spectral energy distribution of the emitted radiation of this lamp is shown in FIG. 3. The wavelength λ is plotted in nm on the horizontal axis of the graph in FIG. 3. The emitted radiation energy E per constant wavelength interval is plotted in arbitrary units on the vertical axis. The reference Hg denotes the visible mercury lines. For the purpose of comparison a lamp having a colour temperature of 4000 K was made which lamp was completely analogous to the above-described lamp in which, however, the material G1 was replaced by the known willemite. The lamp, which is not according to the invention, has a colour rendering index Ra = 80 and a luminous flux at 0 hour $LO_0$ = 73.2 1m/W.

D. A lamp whose luminescent coating consisted of 26% by weight of the material B5, 23% by weight of the material G1 and 51% by weight of the material R3 yielded the following measured values:

| Tk | Ra | $LO_0$ | $LO_{100}$ |
|---|---|---|---|
| 4000 | 87 | 80.0 | 77.5 |

Comparison of the lamps according to the invention described under C and D shows the influence of coactivation of the blue luminescing aluminates with manganese: the lamp of D has a higher colour rendering index and a slightly lower luminous flux.

Replacement of part of the combination of three luminescent materials in a lamp according to the invention by one or more conventional luminescent materials has relatively little influence on the colour rendering index and the luminous flux of the lamp. If, for example, in a lamp according to the invention having a colour temperature Tk = 3000 K and a quantity of 25% by weight of the mixture of the three luminescent materials B4, G1 and R3 is replaced by antimony and manganese-activated calcium halofosfate (colour temperature 3000 K) the luminous flux (at 100 hours) is found to have substantially the same value (approximately 79 lm/W) and Ra is found to decrease by only approximately 5 points (from 86 to approximately 81). A lamp comprising the same combination of luminescent materials B4, G1 and R3, however, with Tk = 4000 K, is found to yield substantially the same luminous flux (approximately 78 lm/W) and to decrease only approximately 5 point in Ra (from 90 to approximately 85) for the same quantity (25% by weight) of halofosfate. The 6500 K lamp is found to maintain the same luminous flux (71 lm/W) and the same Ra (approximately 92) in case of an analogous replacement.

What is claimed is:

1. A low-pressure mercury vapour discharge lamp having a vacuum tight radiation transmitting envelope comprising a quantity of mercury and a quantity of rare gas and provided with electrodes between which the discharge takes place during operation, and with a luminescent coating comprising three luminescent materials, a first material having an emission band at a maximum in the wavelength range between 430 and 490 nm and a half value width of less than 100 nm, a second material mainly having its emission in the wavelength range between 520 nm and 565 nm, and a third material mainly having its emission in the wavelength range between 590 and 630 nm, wherein said second luminescent material is activated by terbium and is selected from the group consisting of materials defined by the formulas:

$Ce_{1-x-y}La_xTb_yMgAl_{11}O_{19}$ and     a
$(Ce_{1-x-y}La_xTb_y)_2O_3 \cdot nAl_2O_3$     b in which $0 \leq x \leq 0.50$
$0.20 \leq y \leq 0.50$
$x+y \leq 0.90$
$10 \leq n \leq 12$ and in which up to a maximum of 25 at% of aluminum may be replaced by elements selected from the group consisting of gallium and scandium and in which magnesium may at least in part be replaced by one or more elements selected from the group consisting of zinc and beryllium.

2. A low-pressure mercury vapour discharge lamp as claimed in claim 1, wherein said second luminescent material is defined by formula (a) and $0 \leq x \leq 0.20$ and $0.20 \leq y \leq 0.40$.

3. A low-pressure mercury vapour discharge lamp as claimed in claim 1, wherein said first luminescent material is activated by bivalent europium.

4. A low-pressure mercury vapour discharge lamp as claimed in claim 3, wherein said first luminescent material is an aluminate of an element selected from the group consisting of barium and strontium activated by a material selected from the group consisting of (1) bivalent europium and (2) bivalent europium and bivalent manganese, which aluminate has a hexagonal crystal structure akin to the structure of the hexagonal ferrites.

5. A low-pressure mercury vapour discharge lamp as claimed in claim 4, wherein said first luminescent material is a ternary aluminate of an element of the group consisting of barium, strontium and magnesium in which the atomic fraction of aluminum is larger than 1.8 times the atomic fraction of magnesium and is also larger than 3.7 times the atomic fraction of the element selected from the group consisting of barium and strontium and in which up to a maximum of 25 at% of aluminum may be replaced by an element selected from the group consisting of gallium and scandium and in which magnesium may at least in part be replaced by an element selected from the group consisting of zinc and beryllium.

6. A low-pressure mercury vapour discharge lamp as claimed in claim 5 characterized in that said first luminescent material is selected from the group consisting of materials defined by the formulas:

$A_{1-p}Eu_pMg_{2-q}Mn_qAl_{16}O_{27}$ and     C
$B_{5.5-x}Eu_xMg_{6-y}Mn_yAl_{55}O_{94}$     D in which A and B represent at least one of the elements selected from the group consisting of barium and strontium and in which $0.05 \leq p \leq 0.20$
$0.25 \leq x \leq 1.50$
$0 \leq g/p \leq 1.5$
$0 \leq y/x \leq 1.5$ 7. A low-pressure mercury vapour discharge lamp as claimed in claim 6, wherein at least 50 at% of A is barium and at least 50 at% of B is strontium.

8. A low-pressure mercury vapour discharge lamp as claimed in claim 1 in which said third luminescent material is a rare earth oxide activated by trivalent europium and defined by the formula $Ln_2O_3:Eu^{3+}$ in which Ln represents at least one of the elements yttrium, gadolinium and lutetium.

9. A low-pressure mercury vapour discharge lamp as claimed in claim 1 wherein said luminescent coating comprises at least one of the luminescent materials selected from the group consisting of antimony-activated alkaline earth halofosfate, antimony and manganese-activated alkaline earth halofosfate, tin-activated alkaline earth magnesium orthofosfate, manganese-activated magnesium arsenate and manganese-activated magnesium germanate in a quantity of not more than 50% by weight.

* * * * *

UNITED STATES PATENT AND TRADEMARK OFFICE
CERTIFICATE OF CORRECTION

PATENT NO. : 3,937,998
DATED : February 10, 1976
INVENTOR(S) : JUDICUS MARINUS P.J. VERSTEGEN ET AL It is certified that error appears in the above-identified patent and that said Letters Patent are hereby corrected as shown below:

Column 4, line 44, "further" should be --Further--;

Column 5, line 43, "$0.001 \leq 1 \leq 0.15$" should be

--$0.001 \leq q \leq 0.15$--

Claim 6, line 38, "g/p" should be --q/p--

Signed and Sealed this fifteenth Day of June 1976

[SEAL]

Attest:

RUTH C. MASON
*Attesting Officer*

C. MARSHALL DANN
*Commissioner of Patents and Trademarks*